United States Patent
Exner et al.

(10) Patent No.: US 12,192,851 B2
(45) Date of Patent: Jan. 7, 2025

(54) ELECTRONIC DEVICE AND A METHOD FOR DETERMINING A TRANSPORTATION PARAMETER OF A WIRELESS DEVICE

(71) Applicant: Sony Group Corporation, Tokyo (JP)

(72) Inventors: Peter Exner, Basingstoke (GB); Hannes Bergkvist, Basingstoke (GB)

(73) Assignee: Sony Group Corporation, Tokyo (JP)

( * ) Notice: Subject to any disclaimer, the term of this patent is extended or adjusted under 35 U.S.C. 154(b) by 37 days.

(21) Appl. No.: 17/732,725

(22) Filed: Apr. 29, 2022

(65) Prior Publication Data

US 2022/0377500 A1 Nov. 24, 2022

(30) Foreign Application Priority Data

May 20, 2021 (SE) .................... 2150645-6

(51) Int. Cl.
| | | |
|---|---|---|
| H04W 4/02 | (2018.01) | |
| H04W 4/029 | (2018.01) | |
| H04W 4/40 | (2018.01) | |

(52) U.S. Cl.
CPC ........... H04W 4/027 (2013.01); H04W 4/029 (2018.02); H04W 4/40 (2018.02)

(58) Field of Classification Search
CPC ....... H04W 4/02; H04W 4/023; H04W 4/027; H04W 4/029; H04W 4/40; H04W 4/80; G06Q 10/083; G06Q 10/0832; G06Q 10/0833; G06Q 10/087; G06Q 50/30;
(Continued)

(56) References Cited

U.S. PATENT DOCUMENTS

| | | |
|---|---|---|
| 8,015,144 B2 | 9/2011 | Zheng |
| 8,058,987 B1 | 11/2011 | Battista |

(Continued)

FOREIGN PATENT DOCUMENTS

| | | |
|---|---|---|
| EP | 3416114 A1 | 12/2018 |
| SE | 1650379 A1 | 9/2017 |

(Continued)

OTHER PUBLICATIONS

The Extended European Search Report from corresponding European Application No. 22165666.3, mailed on Sep. 2, 2022; 8 pages.
(Continued)

*Primary Examiner* — Thomas D Alunkal
(74) *Attorney, Agent, or Firm* — Tucker Ellis LLP

(57) ABSTRACT

An electronic device includes memory circuitry, a wireless interface, and processor circuitry. The processor circuitry is configured to obtain positioning data and movement data from a wireless device. The processor circuitry is configured to determine, based on the positioning data, one or more stops including a first stop of a transportation journey of the wireless device. The processor circuitry is configured to determine, based on movement data associated with the first stop, a transition parameter associated with the first stop. The processor circuitry is configured to determine whether the transition parameter satisfies a first criterion indicative of a change of transportation mode at the first stop. The processor circuitry is configured to output, based on the transition parameter, a transportation parameter.

18 Claims, 8 Drawing Sheets

(58) Field of Classification Search
CPC .. G01C 21/005; G01C 21/28; G01C 21/3423; H04L 67/12
See application file for complete search history.

(56) References Cited

U.S. PATENT DOCUMENTS

| | | | |
|---|---|---|---|
| 8,738,292 B1* | 5/2014 | Faaborg | G01C 21/26 |
| | | | 701/117 |
| 8,954,094 B1* | 2/2015 | Mishra | H04W 4/024 |
| | | | 455/456.3 |
| 9,754,485 B2 | 9/2017 | Holleczek | |
| 9,900,747 B1 | 2/2018 | Park | |
| 10,072,932 B2 | 9/2018 | Cordova | |
| 10,419,878 B1* | 9/2019 | Sanchez | H04W 4/025 |
| 11,290,643 B1* | 3/2022 | Tullis | H04N 23/80 |
| 2009/0216704 A1 | 8/2009 | Zheng | |
| 2016/0327397 A1 | 11/2016 | Cordova | |
| 2019/0383617 A1* | 12/2019 | Winterholler | G01C 21/12 |
| 2020/0334631 A1* | 10/2020 | Conlon | G08B 25/10 |
| 2022/0276061 A1* | 9/2022 | Viitala | G06Q 10/00 |

FOREIGN PATENT DOCUMENTS

| | | |
|---|---|---|
| WO | 2016184530 A1 | 11/2016 |
| WO | 2018226806 A1 | 12/2018 |

OTHER PUBLICATIONS

Office Action and Search Report from corresponding Swedish Application No. 2150645-6, mailed on Feb. 7, 2022, 10 pages.

* cited by examiner

ELECTRONIC DEVICE AND A METHOD FOR DETERMINING A TRANSPORTATION PARAMETER OF A WIRELESS DEVICE

CROSS REFERENCE TO RELATED APPLICATIONS

The present application claims priority to Swedish Patent Application No. 2150645-6, filed May 20, 2021, the disclosure of which is incorporated herein by reference in its entirety.

TECHNICAL FIELD

The present disclosure pertains to the field of Internet of things (IoT) and relates to an electronic device and to a method for determining a transportation parameter of a wireless device.

BACKGROUND

Today, many wireless devices are used for tracking, such as for tracking a positioning and/or for transportation mode (TRAM) detection. However, it may be difficult to differentiate between transportation modes when using wireless devices for tracking.

SUMMARY

Transportation mode detection may be used for sensing user context, providing mobile assistance, adjusting device sensor usage and/or communication patterns. Several transportation mode detection types may be possible. For example, TRAM may be designed for human-based activities and can detect transportation modes, such as walking, cycling, and bus. However, different transportation modes are difficult to detect.

Accordingly, there is a need for electronic devices and methods for determining a transportation parameter of a wireless device (such as an IoT device), which can mitigate, alleviate or address the shortcomings existing and provide an improved transportation mode detection.

An electronic device is disclosed. The electronic device comprises memory circuitry, a wireless interface, and processor circuitry. The processor circuitry is configured to obtain positioning data and movement data from a wireless device. The processor circuitry is configured to determine, based on the positioning data, one or more stops including a first stop of a transportation journey of the wireless device. The processor circuitry is configured to determine, based on movement data associated with the first stop, a transition parameter associated with the first stop. The processor circuitry is configured to determine whether the transition parameter satisfies a first criterion indicative of a change of transportation mode at the first stop. The processor circuitry is configured to output, based on the transition parameter, a transportation parameter.

Further a method, performed by an electronic device, for determining a transportation parameter, is disclosed. The method comprises obtaining positioning data and movement data from a wireless device. The method comprises determining, based on the positioning data, one or more stops including a first stop of a transportation journey of the wireless device. The method comprises determining, based on movement data associated with the first stop, a transition parameter associated with the first stop. The method comprises determining whether the transition parameter satisfies a first criterion indicative of a change of transportation mode at the first stop. The method comprises outputting, based on the transition parameter, a transportation parameter.

It is an advantage of the present disclosure that an improved detection of change of transportation mode in a transportation journey of a wireless device and/or an object associated with the wireless device (such as an IoT device) may be achieved.

It may be appreciated that the present disclosure provides a determination of a transition parameter to improve the detection accuracy in the tracking of wireless devices (for example by improving the detection of change(s) of transportation modes). For example, the present disclosure allows improving accuracy in detecting a point in time when a change of transportation mode occurs. In turn, the present disclosure may provide a transportation parameter to achieve an improved logistical insight for the wireless device and/or an object associated with the wireless device. For example, the present disclosure may allow to detect the unloading and loading of the wireless device (and/or object associated with the wireless device, such as a cargo item associated with the wireless device, so that the object can be tracked) between transportation modes (such as transitions between transportation modes, for example transitions from a first transportation mode to a second transportation mode), which provide insight in the logistics during a transportation journey of the wireless device. Furthermore, the present disclosure may provide a transportation parameter improving the classification of transportation modes.

By determining whether the transition parameter satisfies a first criterion indicative of a change of transportation mode, the present disclosure may reduce the number of false positives regarding the detection of changes of transportation mode. For example, the present disclosure may determine that no change in transportation mode has occurred when a transportation vehicle transporting the wireless device makes a full stop without unloading. The present disclosure may also present the advantage of having an improved adaptability, for example in view of new vehicles (such as vehicles that have not been used before).

The present disclosure may provide continuous improvement of transportation mode detection (such as by training the anomaly detector).

BRIEF DESCRIPTION OF THE DRAWINGS

The above and other features and advantages of the present disclosure will become readily apparent to those skilled in the art by the following detailed description of examples thereof with reference to the attached drawings, in which.

DETAILED DESCRIPTION

Figure 1:
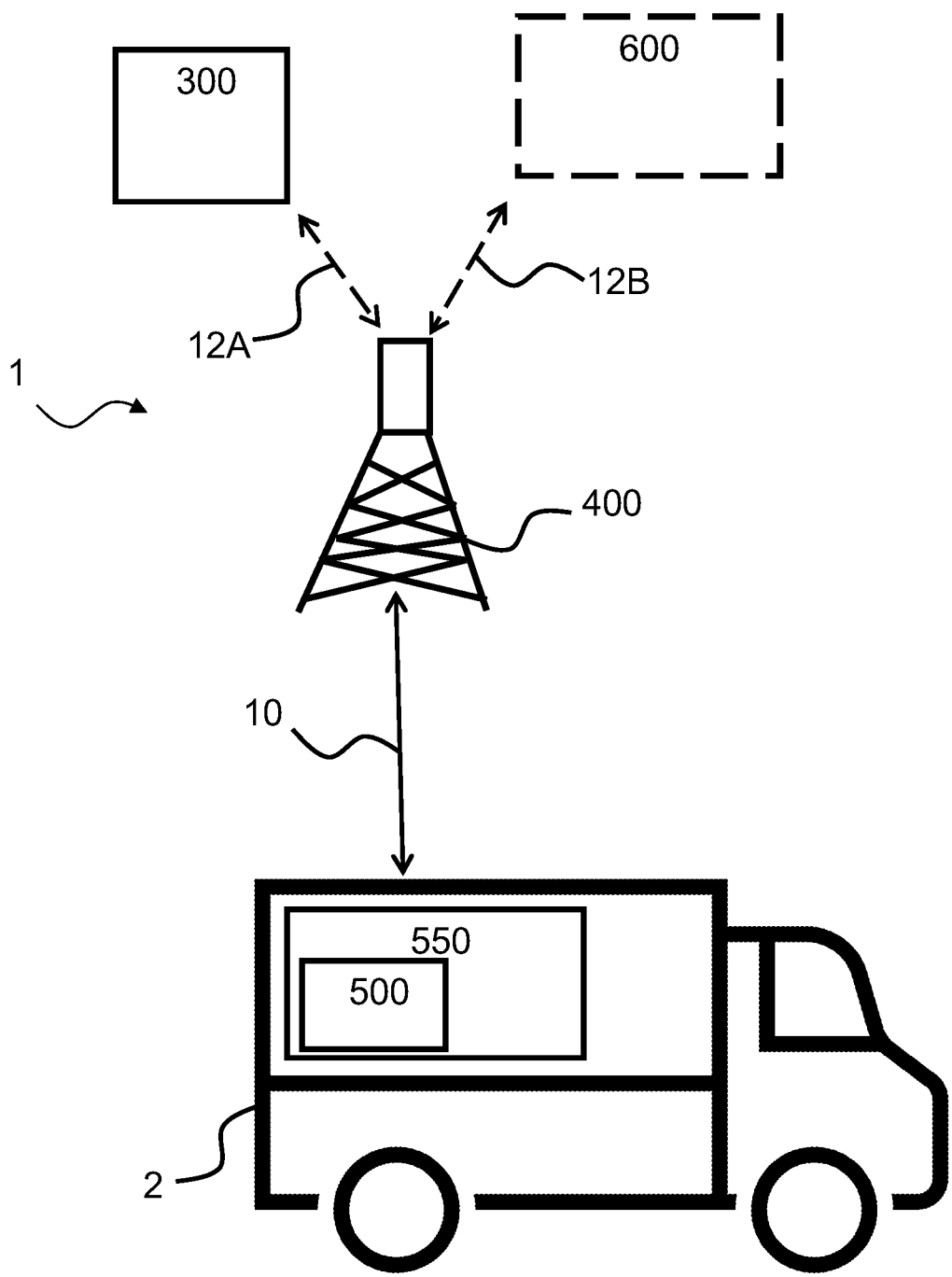
FIG. 1 is a diagram illustrating an example tracking system comprising an example electronic device and an example wireless device according to this disclosure.

Various examples and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the examples. They are not intended as an exhaustive description of the disclosure or as a limitation on the scope of the disclosure. In addition, an illustrated example needs not have all the aspects or advantages shown. An aspect or an advantage described in conjunction with a particular example is not necessarily limited to that example and can be practiced in any other examples even if not so illustrated, or if not so explicitly described.

The figures are schematic and simplified for clarity, and they merely show details which aid understanding the disclosure, while other details have been left out. Throughout, the same reference numerals are used for identical or corresponding parts.

Detecting a change or a transition between transportation modes is a difficult task. It may require manual indication by manually labelling the transportation modes. The present disclosure provides a technique that, inter alia, alleviates this shortcoming and allows to detect a transition between transportation modes. The present disclosure may also avoid performing time-consuming and error-prone manual labelling of transportation modes with a context.

FIG. 1 is a diagram illustrating an example tracking system 1 comprising an example electronic device 300 according to this disclosure, an example wireless device 500 according to this disclosure, and optionally an example server device 600 according to this disclosure. The tracking system 1 may comprise an asset monitoring system, such as comprising the electronic device 300, the electronic device 300 for example being an asset monitoring device.

The tracking system may be seen as a transportation mode detection system. The tracking system may be part of or configured to communicated with a logistic system.

As discussed in detail herein, the present disclosure relates to a tracking system 1. The tracking system 1 may be configured to connect with a cellular system, for example, a 3GPP wireless communication system. The tracking system 1 comprises an electronic device 300.

The tracking system 1 described herein may comprise one or more wireless devices 500. The tracking system 1 may be configured to connect with one or more network nodes 400, such as one or more of: a base station, an eNB, a gNB and/or an access point.

A wireless device may refer to a portable electronic device (such as a mobile device and/or a user equipment, UE, for example a smart phone), and/or an IoT device.

A wireless device disclosed herein may be associated with an object or an item. For example, wireless device 500 may be associated with object 550 to track the object 550. The object or item may be in transportation from a first location to a second location. Although a truck 2 is illustrated in FIG. 1, any transportation means are applicable in this disclosure.

The wireless device 500 may comprise memory circuitry, processor circuitry, and/or a wireless interface (not shown). The wireless interface may be configured for wireless communications via a wireless communication system, such as a 3GPP system, such as a 3GPP system supporting one or more of: New Radio, NR, Narrow-band IoT, NB-IoT, and Long Term Evolution—enhanced Machine Type Communication, LTE-M.

The wireless device 500 may comprise a positioning sensor, such as a Global Navigation Satellite System, GNSS, sensor, such as a global positioning system, GPS, sensor and/or a Galileo sensor. The wireless device 500 may comprise a movement sensor, such as an inertial measurement unit, IMU, an accelerometer, a gyroscope, and/or a magnetometer.

A network node disclosed herein refers to a radio access network node operating in the radio access network, such as a base station, an evolved Node B, eNB, gNB in NR. In one or more examples, the RAN node is a functional unit which may be distributed in several physical units.

The wireless device 500 may be configured to communicate with a network node 400 via a wireless link (or radio access link) 10.

The electronic device 300 may be configured to communicate with the network node 400 via a link 12A, such as wired and/or wireless link, with the server device 600, and/or with the wireless device 500, via the network node 400.

The server device 600 may be configured to communicate with the network node 400 via a link 12B, such as wired and/or wireless link, with the electronic device 300, and/or with the wireless device 500, via the network node 400.

The server device 600 may be seen as a device configured to act as a server in communication with a client device, where the wireless device 500 is configured to act as a client.

The server device 600 may comprise memory circuitry, an interface, and processor circuitry (not shown). The server device 600 may be configured to obtain (such as receive and/or retrieve and/or derive, via a link 12) positioning data and/or movement data from the wireless device 500. The server device 600 may be configured to determine, based on the positioning data, one or more stops including a first stop of a transportation journey of the wireless device 500. The server device 600 may be configured to determine, based on movement data associated with the first stop, a transition parameter associated with the first stop. The server device 600 may be configured to determine whether the transition parameter satisfies a first criterion indicative of a change of transportation mode at the first stop (such as to detect the unloading and loading of the wireless device between transportation modes). The server device 600 may be configured to output (such as transmit, such as via the network node 400), based on the transition parameter, a transportation parameter.

Figure 3A:
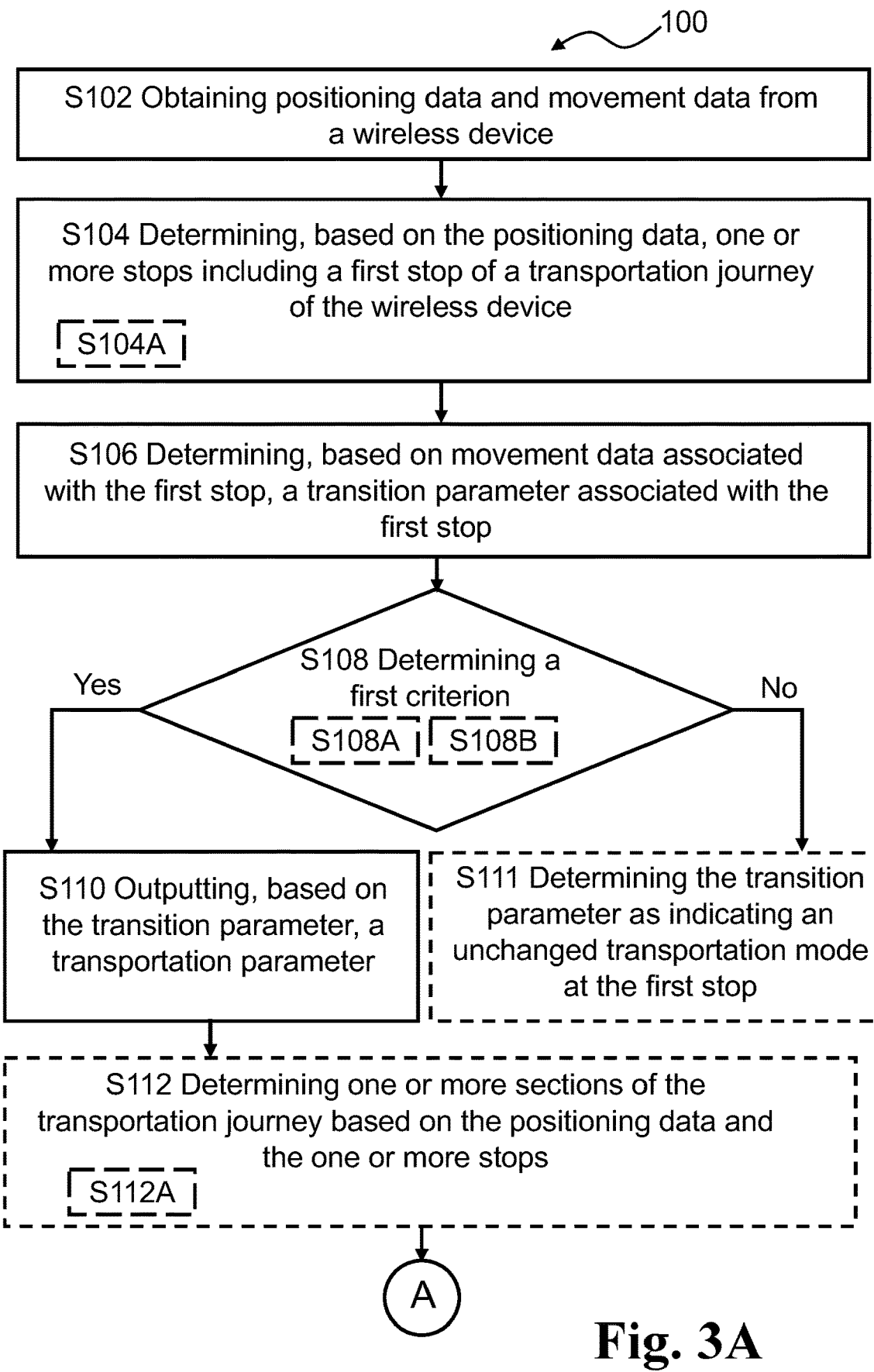
FIGS. 3A-3B are flow-charts illustrating an example method, performed in an electronic device, for determining a transportation parameter according to this disclosure.
Figure 3B:
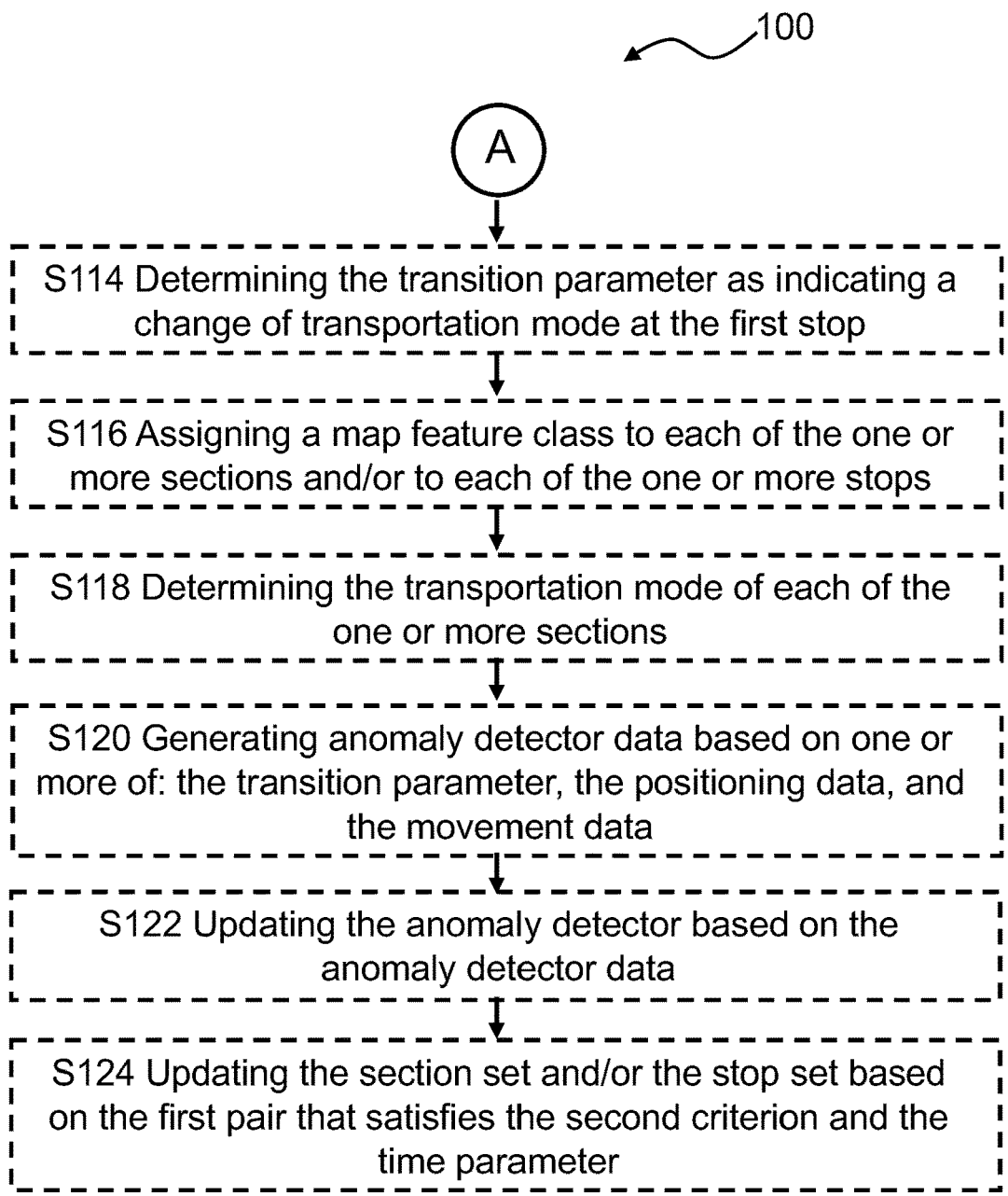

The server device 600 is optionally configured to perform any of the operations disclosed in FIGS. 3A-3B (such as any one or more of S104A, S108A, S108B, S111, S112, S112A, S114, S116, S118, S120, S122, S124). The operations of the server device 600 may be embodied in the form of executable logic routines (for example, lines of code, software programs, etc.) that are stored on a non-transitory computer readable medium (for example, memory circuitry of the server device) and are executed by processor circuitry of the server device).

In one or more example tracking systems, the server device 600 may be configured to perform one or more operations of the electronic device disclosed herein.

Optionally, the electronic device 300 may be configured to act as a server device, such as a cloud based server device, such as server device 600.

Optionally, the wireless device 500 may be configured to perform one or more operations of the electronic device disclosed herein.

Figure 2:
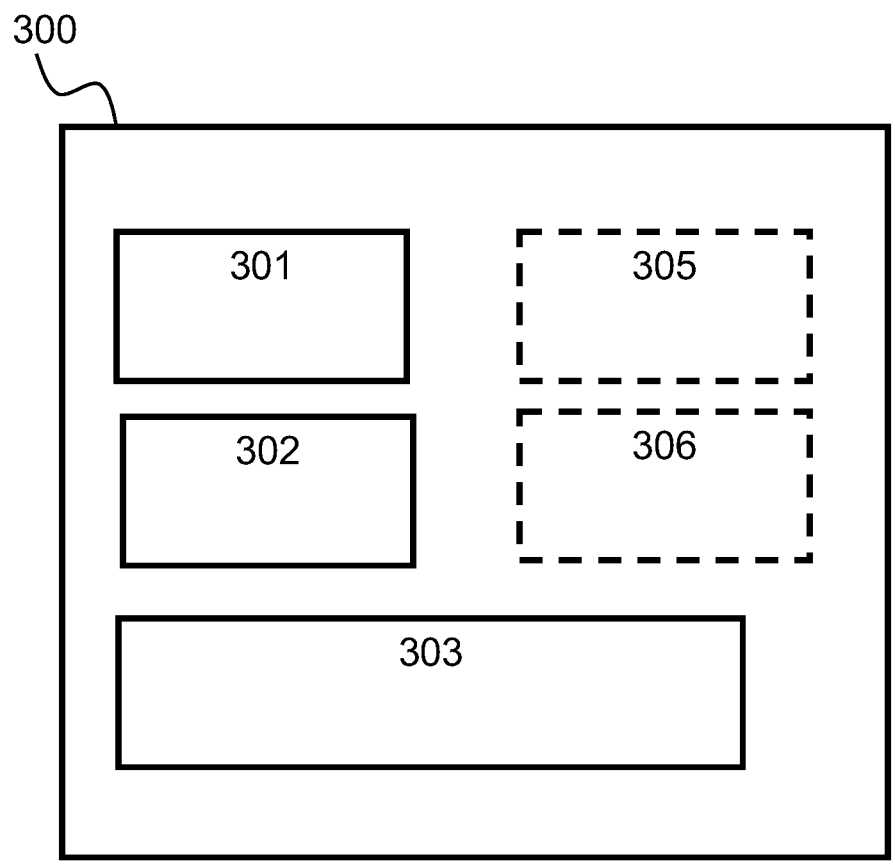
FIG. 2 is a block diagram illustrating an example electronic device according to this disclosure.

FIG. 2. shows a block diagram of an example electronic device 300 according to the disclosure. The electronic device 300 comprises memory circuitry 301, a wireless interface 302, and processor circuitry 303. The electronic device 300 is configured to perform any of the methods disclosed in FIGS. 3A-3B. In other words, the electronic device 300 may be configured to determine a transportation parameter of a wireless device, such as the wireless device 500 disclosed herein.

The electronic device 300 may be an electronic tracking device, such as an object tracking device. The electronic device 300 may be part of a tracking system, such as a logistics system.

The electronic device 300 may be configured to communicate with a network node, such as the network node 400 (not shown) disclosed herein, using a tracking system, such as the tracking system 1 disclosed herein.

The electronic device 300 may be configured to communicate with the network node 400 via a link 12A, such as wired and/or wireless link, with the server device 600, and/or with the wireless device 500, via the network node 400.

The electronic device 300 is configured to obtain, such as via the wireless interface 302 and/or using the processor circuitry 303, positioning data (such as coordinate data of the wireless device) and movement data (such as accelerometer data), from a wireless device, such as the wireless device 400 disclosed herein. The wireless device 500 may be configured to stream positioning data and/or movement data to the electronic device 300, such as via the network node 400. In one or more example electronic devices, the electronic device 300 is configured to perform any of the operations disclosed in FIGS. 3A-3B while the wireless device 500 is on the transportation journey (such as performing any of the operations dynamically, for example in a live fashion).

In one or more example electronic devices, the positioning data comprises a position set comprising position coordinates of the wireless device associated with the transportation journey. For example, the positioning data, such as the position set, may comprise all the position coordinates of the wireless device along the transportation journey.

In some examples, the position set may comprise one or more of pre-determined position coordinates along the transportation journey.

In one or more example electronic devices, the positioning data comprises a time parameter. In some examples, the time parameter may be indicative of a time stamp associated with the positioning data, such as timestamped positioning data. For example, each data element of the positioning data may be timestamped.

In one or more example electronic devices, the positioning data comprises Global Navigation Satellite System, GNSS, data, such as a global positioning system, GPS, data and/or Galileo data.

In one or more example electronic devices, the movement data comprises inertial measurement, IMU, data. The IMU data may comprise one or more of: accelerometer data, gyroscope data, and magnetometer data.

In one or more example electronic devices, the inertial measurement data comprises a time parameter. In some examples, the time parameter may be indicative of a time stamp associated with the IMU data, such as timestamped IMU data.

For example, each data element of the IMU data may be timestamped, such as one or more timestamps associated with the IMU data.

In some examples, measurements, such as measured IMU data and/or positioning data may be timestamped. For example, a measurement tuple may comprise a timestamp, IMU data corresponding to the timestamp, and/or positioning data corresponding to the timestamp. For example, an accelerometer sensor sampling function could return movement data, for example in form of measurement tuple, such as (acc_x, acc_y, acc_z, timestamp).

The electronic device 300 is configured to determine (such as using the processor circuitry 303), based on the positioning data, one or more stops including a first stop of a transportation journey of the wireless device.

A stop may be seen as a point in space that can be associated with at least one section. For example, a stop may form a start point of a section and/or an end point of a section (such as the end of a section and the start of a next section). A stop may comprise one or more coordinates (such as one or more coordinates of a stop set).

The term "first" stop is merely used as a label for a stop and does therefore not necessarily designate the actual initial stop of the transportation journey. Although the term "first" stop is used, this could mean any of the one or more stops of the transportation journey of the wireless device. The first stop may indicate any of the one or more stops of the transportation journey of the wireless device. In other words, the first stop may indicate the stop that the electronic device (such as the processor circuitry) is currently processing (such as evaluating). For example, the processor circuitry may be configured to perform the determination of a transition parameter, the determination of whether the transition parameter satisfies a first criterion indicative of a change of transportation mode (such as catch or identify), and/or the outputting of a transportation parameter for one or more of the stops of the transportation journey, such as all the stops of the transportation journey.

The transportation journey may comprise a starting point (such as an initialization point of the journey) and an ending point (such as a destination point of the journey). The starting point and/or the ending point may also be considered as stops.

In one or more example electronic devices, when the one or more stops satisfy a map criterion, the processor circuitry is configured to assign a map feature class to each of the one or more stops. In one or more example electronic devices, when the first stop satisfies a map criterion, the processor circuitry is configured to assign a map feature class (such as one or more labels indicative of context) to the first stop. The map feature class may comprise a map feature class indicative of highway, a map feature class indicative of railway, a map feature class indicative of an airport, a map feature class indicative of a harbour, a map feature class indicative of a train station, a map feature class indicative of a bus station, a map feature class indicative of a package transit centre, and/or a map feature class indicative of a logistics hub. It may be appreciated that this may lead to an improved accuracy. It may avoid performing time-consuming manual labelling.

In one or more example electronic devices, the determining of one or more stops of the transportation journey of the wireless device is based on obtaining, from the position set, a stop set comprising stop coordinates associated with the one or more stops.

For example, the stop set may comprise all the position coordinates of the wireless device being associated with the one or more stops of the wireless device along the transportation journey. In some examples, the stop set may comprise one or more of pre-determined stop coordinates along the transportation journey. In some examples, a clustering algorithm, such as Density-based spatial clustering of applications with noise (DBSCAN), may be used to extract, from the position set, one or more of sets of coordinates representing stops.

The electronic device 300 is configured to determine, such as using the processor circuitry 303, based on movement data associated with the first stop, a transition parameter associated with the first stop. To determine the transition parameter may comprise determining a value based on the movement data associated with the first stop. For example, the value may be binary wherein '1' indicates that a transition occurred and '0' indicates that no transition occurred. The transition parameter may comprise a value and/or a confidence score.

In one or more example electronic devices, to determine the transition parameter may comprise determining a non-binary value, for example being indicative of one or more of an error for a reconstruction based anomaly detection (such as a part of a section and/or corresponding movement data that may have to be re-evaluated, such as recalculated and/or recomputed), and/or a distance for a prediction-based anomaly detection (such as an anomaly parameter using the anomaly detector). In one or more example electronic devices, the transition parameter is indicative of one or more of: a load indicator, an unload indicator, and a geographical indicator (such as a geographical indicator associated with the first stop, for example based on the map feature class assigned to the first stop). For example, a geographical indicator associated with the first stop may comprise associating the map feature class "warehouse" or "gas station" to the first stop.

The geographical indicator may be based on a map feature class assigned (such as one or more label indicative of context) to a stop, such as the first stop. The geographical indicator may for example comprise a value representing a map feature class, such as indicative of an airport, a harbour, a train station, a bus station, a package transit centre, and/or a logistics hub. The geographical indicator may comprise a probability of change in transportation mode at a given map feature class. The geographical indicator may for example comprise a confidence score associated with the geographical indicator. For example, the geographical indicator may indicate a train station with a confidence score of 0.85 (such as 85% confidence that it is in fact a train station).

The processor circuitry may be configured to determine the transition parameter based on the movement data associated with the first stop and the geographical indicator.

The electronic device 300 is configured to determine, such as using the processor circuitry 303, whether the transition parameter satisfies a first criterion indicative of a change of transportation mode at the first stop. In other words, to determine whether the transition parameter satisfies the first criterion comprises identifying whether a change in transportation mode has occurred at the first stop (such as checking a transportation mode at a stop). This may for example allow to differentiate between a stop of the wireless device at an intersection, and a stop to perform a change in transportation mode.

In one or more example electronic devices, the first criterion comprises a first threshold. The first criterion may comprise one or more first thresholds, such as including a plurality of thresholds. A first threshold may for example comprise a threshold associated with the load indicator, the unload indicator, and/or the geographical indicator.

The electronic device 300 is configured to output (such as via the wireless interface 302 and/or using the processor circuitry 303), based on the transition parameter, a transportation parameter. A transportation parameter may for example be used in the tracking system disclosed herein, a shipping service (such as to improve an accuracy of tracking of packages), logistics systems, a tracking platform, and/or an asset tracking system.

In one or more example electronic devices, when it is determined that the transition parameter satisfies the first criterion, the processor circuitry 303 is configured to determine the transition parameter as indicating a change of transportation mode at the first stop. A transportation mode may comprise any type of vehicles, such as a car, a truck, a plane, a drone, and/or a ship/boat). The term transportation may be understood as shipment, travel, and/or moving.

For example, when it has been determined that the transition parameter satisfies the first criterion, the transportation parameter comprises an indication that a change in transportation mode has occurred. The transportation parameter may comprise a previous transportation mode and/or a next transportation mode (such as a nature of transportation mode, for example the type of vehicle), a transportation speed and/or time (such as of the previous transportation mode), and/or a transit speed and/or time. Optionally, the determination of the transportation parameter comprises determining a speed (such as estimating a speed between two stops) of the wireless device for each section. For example, the processor circuitry may be configured to determine a speed of the wireless device by using a time parameter (such as one or more timestamps associated with each coordinate of the section set) and/or estimating a path that the wireless device has travelled between two stops (for example the shortest path between the two stops). For example, when one or more coordinates (such as a start coordinate and/or an end coordinate) have been assigned to the map feature class "road", then the processor circuitry may assume that the wireless device has travelled by that road (such as route).

In one or more example electronic devices, the transportation parameter is indicative of one or more of: a load indicator, an unload indicator, and a geographical indicator (such as a geographical indicator associated with the first stop, for example based on the map feature class assigned to the first stop). For example, the transportation parameter may indicate when a load has occurred and/or an unload has occurred in/during the transportation journey of the wireless device (such as at the one or more stops).

In one or more example electronic devices, the transition parameter indicating the change of transportation mode at the first stop is associated with a stop set comprising stop coordinates associated with the first stop. In other words, the stop coordinates associated with the first stop (such as inside a stop, for example inside a given area around a stop, such as a square or a radius around a stop) may be assigned with the load indicator, the unload indicator, and/or the geographical indicator of the transition parameter.

In one or more example electronic devices, when it is determined that the transition parameter does not satisfy the first criterion, the processor circuitry 303 is configured to determine the transition parameter as indicating an unchanged transportation mode at the first stop (such as on hold, resting, and/or stopped at a traffic light). In other words, when it has been determined that the transition parameter does not satisfy the first criterion, the transportation parameter comprise an indication that no change in transportation mode has occurred, such as that the transportation mode is maintained.

In one or more example electronic devices, the determination of whether the transition parameter satisfies the first criterion is based on determining, using an anomaly detector and the movement data associated with the first stop, an anomaly parameter. Using the anomaly detector may comprise applying the anomaly detector to the movement data associated with the first stop, such as the movement data associated with the stop set comprising stop coordinates associated with the first stop. The anomaly detector may be seen as a model and/or a scheme configured to provide, based on the movement data, and/or positioning data, the anomaly parameter. The anomaly detector may be seen as a model and/or a scheme configured to provide, based on the movement data, and/or positioning data, an anomaly parameter. Anomaly parameter may be seen as a parameter indicative of an anomaly, a deviation, a variation, a failure, an outlier and/or a fault.

In one or more example electronic devices, the determination of whether the transition parameter satisfies the first criterion is based on determining whether the anomaly parameter satisfies a second criterion. The second criterion may allow to find the largest anomaly amongst the anomalies detected by the anomaly detector. For example, an anomaly parameter may indicate a deviation value, and the anomaly parameter indicating the largest deviation value satisfies the second criterion.

In one or more example electronic devices, the second criterion comprises a second threshold. The second criterion may comprise one or more second thresholds, such as including a plurality of thresholds. A second threshold may for example comprise a threshold associated with the anomaly data, which may include accelerometer data associated with the anomaly(ies) detected. A second threshold may comprise a threshold associated with an acceleration anomaly threshold.

In one or more example electronic devices, the anomaly parameter comprises a first pair of coordinates of the stop set associated with the first stop.

In one or more example electronic devices, the first pair of coordinates may be indicative of a termination of a section and a start of a stop, such as of the first stop. The determination, using the anomaly detector and the movement data associated with the first stop of an anomaly parameter may be repeated for each set of stop coordinates of the first stop. In one or more example electronic devices, the processor circuitry is configured to determine an anomaly parameter indicating a largest anomaly, such as a largest acceleration anomaly.

The anomaly parameter may comprise a last pair of coordinates of the stop set associated with the first stop. In other words, the electronic device may be configured to apply the anomaly detector to the last pair of coordinates of the stop set associated with the first stop.

The anomaly parameter may comprise the pairs of coordinates between the first pair and the last pair of the stop set associated with the first stop. In other words, the electronic device may then be configured to repeat the applying of the anomaly detector to the remaining pairs of coordinates of the stop set associated with the first stop.

The second criterion may be indicative of a largest anomaly, such as the second criterion may comprise one or more thresholds, for example for acceleration anomaly. In other words, to determine whether the anomaly parameter satisfies the second criterion may comprise to determine which pair of coordinates of the stop set associated with the first stop that has the largest anomaly (such as being indicative of a change of transportation mode).

The processor circuitry 303 described herein may apply, for the anomaly detector, artificial intelligence and/or be trained using supervised or unsupervised machine learning, and the machine learning program can employ a neural network. The neural network may be one or more of: a convolutional neural network, a deep learning neural network, and a combined learning module or program. Machine learning may be seen as identifying and/or recognizing patterns in existing data (such as movement data, positioning data, transition parameter, and/or transportation parameter) in order to facilitate making predictions for subsequent data, such as control parameter. Models may be created based on example inputs in order to make valid and reliable predictions for novel inputs and/or outputs. Additionally or alternatively, the anomaly detector and related machine learning programs may be trained by inputting sample data sets or certain data into the programs, such as input data, mobile data, and/or numerical analysis thereof. The anomaly detector may utilize deep learning algorithms that may be primarily focused on pattern recognition, and may be trained after processing multiple examples. The anomaly detector and associated program may include Bayesian program learning (BPL). Additionally or alternatively, the anomaly detector may be trained to reconstruct sampled data sets and/or to predict future values of sampled data sets.

In supervised machine learning, the processor circuitry 303 described herein may be provided with example inputs and their associated outputs, and may seek to discover a general rule that maps inputs to outputs, so that when subsequent novel inputs are provided the processor circuitry 303 may, based upon the discovered rule, accurately predict the correct output. In unsupervised machine learning, the processor circuitry 303 may be required to find its own structure in unlabeled example inputs. In one or more examples, machine learning techniques may be used to extract data from input data set, such as positioning data set (such as position set, section set, stop set comprising coordinates as defined herein), and/or other data sets. Based on these analyses, the processing circuitry 303 may learn how to identify characteristics and patterns (such as transition pattern(s) and/or transportation mode pattern(s)) that may then be applied to training the anomaly detector(s), and predicting the transition parameter and/or the transportation parameter disclosed herein.

In one or more example electronic devices, the processor circuitry 303 is configured to determine one or more sections of the transportation journey based on the positioning data and the one or more stops. A section may be seen as a part of a transportation journey, such as a part between two stops of the transportation journey. A section may be associated with at least one position coordinate, such as at least two position coordinates. In other words, a section may be associated with one or more coordinates, such as the set of position coordinates located between two stops. The term section may be understood as a segment, a part, a partition, a division, portion, and/or sector of a transportation journey.

In one or more example electronic devices, the determining of one or more sections of the transportation journey is based on obtaining, from the position set, a section set comprising section coordinates associated with the one or more sections. In some examples, a clustering algorithm (such as to cluster, collect, group, and/or bundle), such as DBSCAN, may be used to extract, from the position set, one or more of sets of coordinates representing sections.

In one or more example electronic devices, a section is located between two stops of the one or more stops. In other words, the processor circuitry may be configured to partition the position coordinates between two stops into a section. It may be appreciated that, the position coordinates between two stops may form a section (such as a segment of the transportation journey). In other words, each stop may have a prior section before the stop and a post section after the stop.

In one or more example electronic devices, when the one or more sections satisfy a map criterion, the processor circuitry is configured to assign (such as allocate and/or distribute) a map feature class (such as contextual map data, indicative of context) to each of the one or more sections. In other words, the processors circuitry may be configured to assign a map feature class to the section coordinates associated with a given section. For example, the section coordinates of a section may be assigned the map feature class "railway" and/or "train". When a start coordinate and a final coordinate of a section are located at a harbour (such as near a harbour), the map feature class "sea" and/or "ship or boat" may be assigned to the section coordinates associated with that section. Another example may be that the processor circuitry is configured to assign the map feature class "air" and/or "plane" based on a speed of the wireless device on a section (such as when a speed exceeds, is below, or is in a range of a certain speed threshold) and/or when a start coordinate, and a final coordinate of a section are located at an airport (such as near an airport). For example, when the section coordinates of a section have been assigned to the map feature class "road", the processor circuitry may be configured to obtain (such as look up) speed limits and/or local road law of that road (such as for cars and/or trucks). This may for example allow to differentiate between a car and a truck (for example when the speed limits are different for cars and trucks).

In one or more example electronic devices, the processor circuitry 303 is configured to determine the transportation mode of each of the one or more sections.

In some examples, determining a transportation mode of each of the one or more sections may be based on the map feature class, positioning data, movement data, and/or a transportation mode criterion (such as comprising one or more transportation thresholds).

In other words, the processor circuitry may be configured to assign a transportation indicator (such as indicative of a transportation mode) to each section coordinate of the section sets associated with the one or more sections.

In one or more example electronic devices, the processor circuitry 303 is configured to generate anomaly detector data (such as training data) based on one or more of: the transition parameter, the positioning data, the movement data, and/or the transportation parameter. The anomaly detector data may be used to train the anomaly detector (such as to improve transportation mode detection). For example, the present disclosure may allow improving accuracy in detecting a point in time when a change of transportation mode occurs. In other words, the processor circuitry may be configured to annotate (such as label, tag, mark, and/or flag) the movement data (such as IMU data) based on the positioning data (such as based on the one or more stops, for example stops that have been assigned a map feature class and/or based on the one or more sections, for example sections that have been assigned a map feature class).

In one or more example electronic devices, the processor circuitry 303 is configured to update the anomaly detector based on the anomaly detector data. In other words, the processor circuitry 303 is configured to train (such as re-train, practice, and/or teach) the anomaly detector based on the anomaly detector data. For example, the processor circuitry may be configured to train the anomaly detector (such as train an anomaly detector model) based on annotated movement data (such as IMU data). The electronic device 300 may be configured to distribute the updated anomaly detector to one or more wireless devices. When a server device acts as the electronic device 300, the server device may be configured to distribute the updated anomaly detector to one or more electronic devices and/or wireless devices.

In one or more example electronic devices, the processor circuitry 303 is configured to update the section set and/or the stop set based on the first pair that satisfies the second criterion and the time parameter. In other words, the processor circuitry 303 may be configured to update (such as reassign) one or more section coordinates and/or one or more stop coordinates. For example, the processor circuitry 303 may be configured to reassign a section coordinate to a stop coordinate instead or vice-versa (such as reassign coordinates that were previously assigned to a section or a stop). This may allow to determine an actual position of a stop and/or an actual end or start position of a section. Further, this may allow to determine where and when a change in transportation mode has occurred and to improve the accuracy of transportation mode detection.

For example, the electronic device may be configured to assign (such as extend) an actual end-point of the section to an updated (such as new) coordinate, and to assign (such as extend) an actual start-point of the section to an updated (such as new) coordinate.

In one or more example electronic devices, the wireless device acts as the electronic device. When the wireless device acts as the electronic device parts of or all of the operations of the electronic device may be performed locally on the wireless device. The wireless device may be configured to perform any of the operations disclosed in FIGS. 3A-3B. When the wireless device acts as the electronic device, the electronic device 300 may optionally comprise a positioning sensor 305, such as a Global Navigation Satellite System, GNSS, sensor, such as a global positioning system, GPS, sensor and/or a Galileo sensor. Optionally, the electronic device 300 may comprise a movement sensor 306, such as an inertial measurement unit, IMU, an accelerometer, a gyroscope, and/or a magnetometer.

In one or more example electronic devices, the electronic device is a server device. When the server device acts as the electronic device parts of or all of the operations of the electronic device may be performed on the server (such as on a cloud server) which obtains positioning data and/or movement data from the wireless device and/or transmits data (such as an anomaly detector, for example an updated anomaly detector) to the wireless device. The wireless device may be configured to perform any of the operations disclosed in FIGS. 3A-3B.

The electronic device 300 is optionally configured to perform any of the operations disclosed in FIGS. 3A-3B (such as any one or more of S104A, S108A, S108B, S111, S112, S112A, S114, S116, S118, S120, S122, S124). The operations of the electronic device 300 may be embodied in the form of executable logic routines (for example, lines of code, software programs, etc.) that are stored on a non-transitory computer readable medium (for example, memory circuitry 301) and are executed by processor circuitry 303).

Furthermore, the operations of the electronic device 300 may be considered a method that the electronic device 300 is configured to carry out. Also, while the described functions and operations may be implemented in software, such functionality may also be carried out via dedicated hardware or firmware, or some combination of hardware, firmware and/or software.

Memory circuitry 301 may be one or more of a buffer, a flash memory, a hard drive, a removable media, a volatile memory, a non-volatile memory, a random access memory (RAM), or other suitable device. In a typical arrangement, memory circuitry 301 may include a non-volatile memory for long term data storage and a volatile memory that functions as system memory for processor circuitry 303. Memory circuitry 301 may exchange data with processor circuitry 303 over a data bus. Control lines and an address bus between memory circuitry 301 and processor circuitry 303 also may be present (not shown in FIG. 3). Memory circuitry 301 is considered a non-transitory computer readable medium.

Memory circuitry 301 may be configured to store information (such as positioning data, movement data, stops, sections, transition parameters, transportation parameters, time parameters, and/or anomaly detector data) in a part of the memory.

FIGS. 3A-3B shows a flow diagram of an example method 100, performed by an electronic device according to the disclosure (such as the electronic device 300 of FIGS. 1, 2), for determining a transportation parameter of a wireless device (such as the wireless device disclosed herein).

The method 100 comprises obtaining S102 positioning data and movement data from a wireless device.

The method 100 comprises determining S104, based on the positioning data, one or more stops including a first stop of a transportation journey of the wireless device.

The method 100 comprises determining S106, based on movement data associated with the first stop, a transition parameter associated with the first stop.

The method 100 comprises determining S108 whether the transition parameter satisfies a first criterion indicative of a change of transportation mode at the first stop.

The method 100 comprises outputting S110, based on the transition parameter, a transportation parameter.

In one or more example methods, the positioning data comprises a position set comprising position coordinates of the wireless device associated with the transportation journey.

In one or more example methods, the movement data comprises inertial measurement data.

In one or more example methods, the inertial measurement data comprises a time parameter.

In one or more example methods, the determining S104 of one or more stops of the transportation journey of the wireless device is based on obtaining S104A, from the position set, a stop set comprising stop coordinates associated with the one or more stops.

In one or more example methods, the method 100 comprises determining S112 one or more sections of the transportation journey based on the positioning data and the one or more stops.

In one or more example methods, the determining S112 of one or more sections of the transportation journey is based on obtaining S112A, from the position set, a section set comprising section coordinates associated with the one or more sections.

In one or more example methods, a section is located between two stops of the one or more stops.

In one or more example methods, when it is determined that the transition parameter satisfies the first criterion, the method 100 comprises determining S114 the transition parameter as indicating a change of transportation mode at the first stop.

In one or more example methods, the transition parameter indicating the change of transportation mode at the first stop is associated with a stop set comprising stop coordinates associated with the first stop.

In one or more example methods, the transition parameter is indicative of one or more of: a load indicator, an unload indicator, and a geographical indicator.

In one or more example methods, the determining S108 of whether the transition parameter satisfies the first criterion is based on determining S108A, using an anomaly detector and the movement data associated with the first stop, an anomaly parameter.

In one or more example methods, the determining S108 of whether the transition parameter satisfies the first criterion is based on determining S108B whether the anomaly parameter satisfies a second criterion.

In one or more example methods, the anomaly parameter comprises a first pair of coordinates of the stop set associated with the first stop.

In one or more example methods, when the one or more sections satisfy a map criterion, the method comprises assigning S116 a map feature class to each of the one or more sections.

In one or more example methods, the method 100 comprises determining S118 the transportation mode of each of the one or more sections.

In one or more example methods, when it is determined that the transition parameter does not satisfy the first criterion, the method comprises determining S111 the transition parameter as indicating an unchanged transportation mode at the first stop.

In one or more example methods, the method 100 comprises generating S120 anomaly detector data based on one or more of: the transition parameter, the positioning data, and the movement data.

In one or more example methods, the method 100 comprises updating S122 the anomaly detector based on the anomaly detector data.

In one or more example methods, the method 100 comprises updating S124 the section set and/or the stop set based on the first pair that satisfies the second criterion and the time parameter.

In one or more example methods, the wireless device acts as the electronic device.

In one or more example methods, the electronic device is a server device

Figure 4:
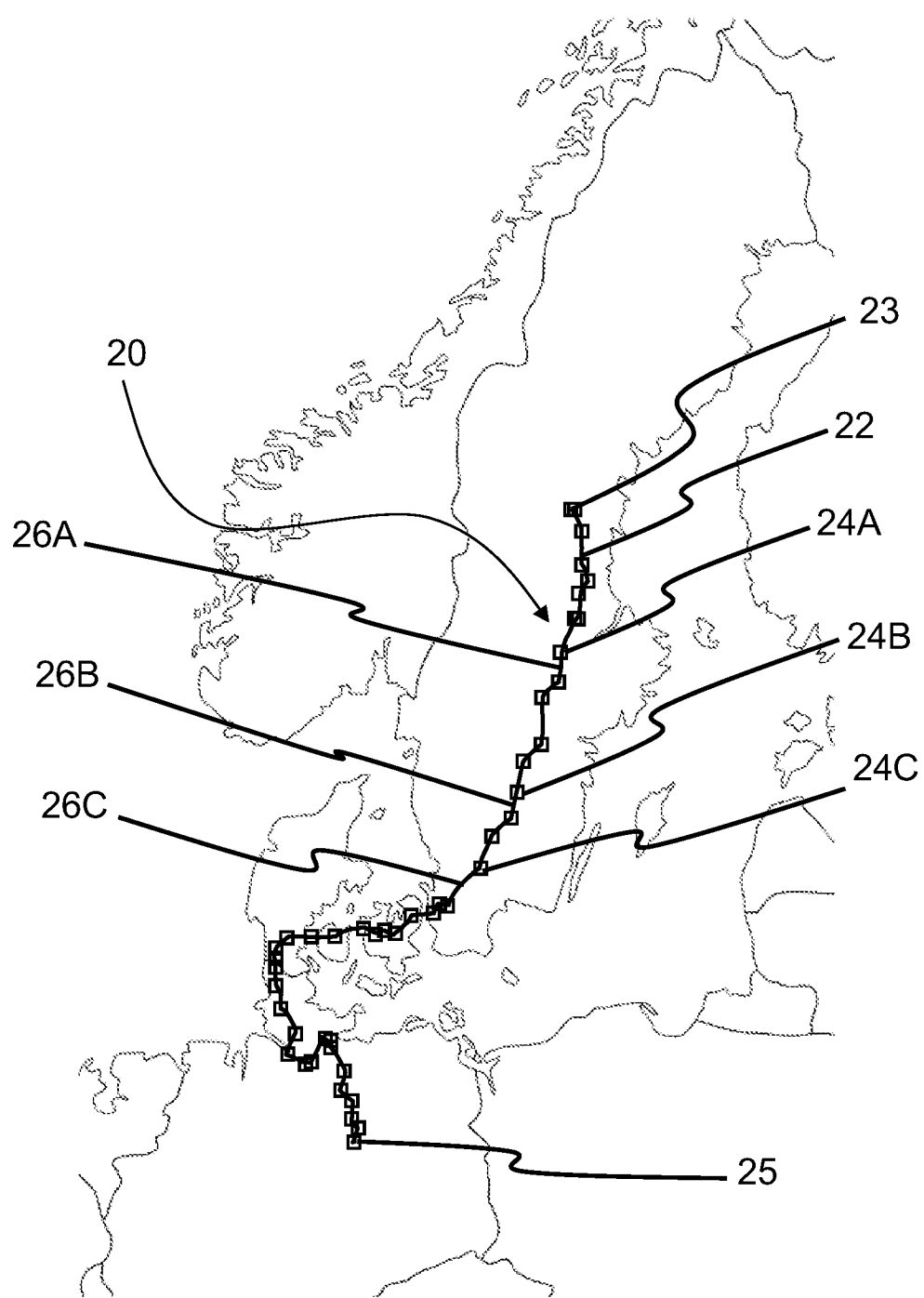
FIG. 4 is a schematic representation illustrating an example showing one or more stops of a transportation journey.

FIG. 4 is a schematic representation illustrating an example showing a plurality of stops 24A, 24B, 24C (such as the one or more stops including the first stop according to this disclosure determined by an electronic device according to this disclosure) of a transportation journey 20 of a wireless device (such as the wireless device 500 of. FIGS. 1, 2). A schematic representation of a map is shown in FIG. 4 for illustrative purposes in the background of the figure. The transportation journey 20 of the wireless device (such as based on the positioning data and/or movement data of the wireless device) is represented by a line across the map. The transportation journey 20 comprises a position set comprising position coordinates of the wireless device associated with the transportation journey 20. The stops 24A, 24B, 24C of the transportation journey 20 are represented by squares.

An electronic device (such as the electronic device 300 of FIGS. 1, 2) has determined one or more sections of the transportation journey 20 based on the positioning data and the one or more stops. The transportation journey 20 may comprise a plurality of sections 26A, 26B, 26C (such as the one or more sections according to this disclosure). The sections 26A, 26B, 26C are each located between two stops. The transportation journey 20 comprises a starting point 23 (such as an initialization point) and an ending point 25 (such as a destination point). The starting point 23 and/or the ending point 25 may also be considered as stops.

The transportation journey 20 may comprise one or more transportation modes (such as type of vehicles, for example a car, a truck, a plane, and/or a ship/boat). The transportation journey 20 may comprise one or more map feature classes (such as land, water, air, and/or road), for example assigned to the one or more sections.

The transportation journey 20 may comprise one or more one or more of a load indicator, an unload indicator, and a geographical indicator, such as assigned to the one or more stops.

Figure 5:
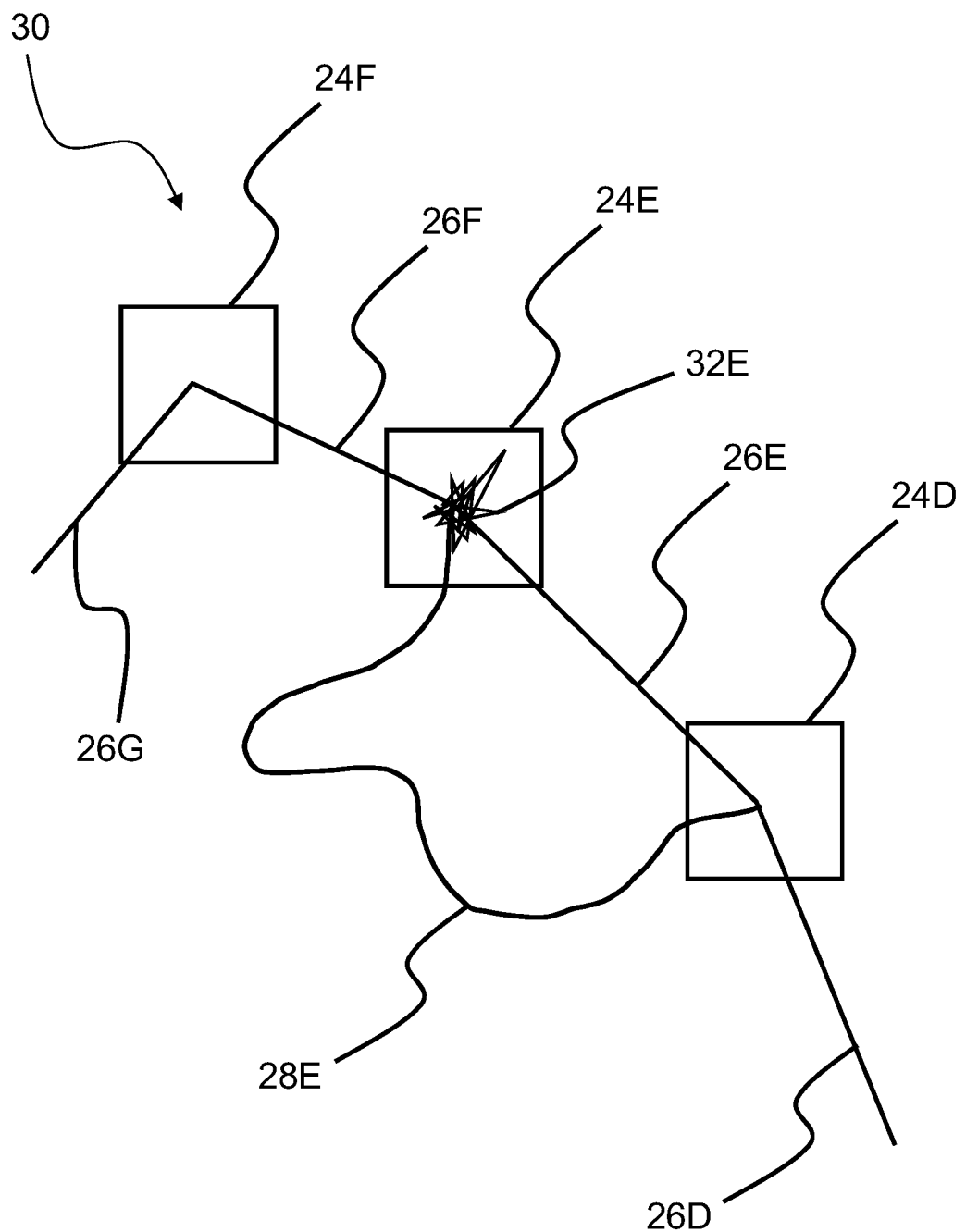
FIG. 5 is a schematic representation illustrating an example showing a close-up view of three stops including the first stop of the transportation journey.

FIG. 5 is a schematic representation illustrating an example showing a close-up view of three stops including a first stop (such as a first stop according to this disclosure) of a transportation journey of a wireless device (such as the wireless device 500 of. FIGS. 1, 2). The first stop may indicate any of the one or more stops of the transportation journey of the wireless device. The first stop may indicate the stop that the electronic device (such as the processor circuitry) is currently processing (such as evaluating). In FIG. 5, an electronic device (such as the processor circuitry of the electronic device 300 of FIGS. 1, 2) has determined three stops 24D, 24E, 24F, each comprising a square being indicative of a stop (such as comprising a stop set comprising one or more stop coordinates), including a first stop 24E of a transportation journey 30 (such as the transportation journey according to this disclosure, for example a portion of the transportation journey 20 of FIG. 4) based on the positioning data of the wireless device. The electronic device (such as the electronic device 300 of FIGS. 1, 2) has determined four sections 26D, 26E, 26F, 26G of the transportation journey 30 based on the positioning data and the three stops 24D, 24E, 24F. As it can be seen the square representing the first stop 24E comprises lines 32E representing positioning data of the wireless device associated with the first stop 24E. The lines 32E may indicate that the positioning data (such as the output from the positioning sensor, for example the positioning sensor 305, not shown) is noisy when the wireless device 500 is substantially not moving (such as standing still). The electronic device determines, based on the movement data (such as accelerometer data) associated with the first stop, a transition parameter associated with the first stop 24E. The electronic device determines whether the transition parameter satisfies a first criterion indicative of a change of transportation mode at the first stop 24E. The electronic device outputs, based on the transition parameter, a transportation parameter. Optionally, when the one or more sections 26D, 26E, 26F, 26G satisfy a map criterion, the electronic device is configured to assign a map feature class to each of the one or more sections (such as assigning a map feature class to each section set comprising section coordinates of each section). For example, in FIG. 5 the electronic device has assigned the map feature class "highway" to the section 26D, the map feature class "highway" to the section 26E, the map feature class "railway" to the section 26F, and the map feature class "railway" to the section 26G. Optionally, when the one or more stops 24D, 24E, 24F satisfy a map criterion, the electronic device is configured to assign a map feature class to each of the one or more stops (such as assigning a map feature class to each stop set comprising stop coordinates of each stop). For example, in FIG. 5 the electronic device has assigned the map feature class "highway" to the stop 24D, the map feature class "highway" to the stop 24E, and the map feature class "railway" to the section 24F. Optionally, the determination of the transportation parameter comprises determining a speed (such as estimating a speed between two stops) of the wireless device for each section. For example, the electronic device may determine a speed (such as a transportation speed) of the wireless device along the section 26D, 26E, 26F, and/or 26G.

Optionally, the electronic device is configured to determine an alternative section between two stops. For example, the electronic device has determined the alternative section 28E, which may correspond to the shortest path between the stop 24D and the stop 24E by a certain transportation mode (such as by road). Depending on which path the wireless device has travelled, the electronic device may be able to determine which section is correct (the section that the wireless device has travelled) between the stop 24D and the stop 24E. The section 26E may correspond to the shortest path between the stop 24D and the stop 24E by a certain transportation mode (in this example by train/rails). In this example, the section that the wireless device has travelled is the section 26E, because the transportation mode has been determined to be by "train". In other words, if the transportation mode would have been determined to be by "car" or "truck", the shortest path would have been the section 28E.

At the stop 24E, the electronic device has determined that the transition parameter satisfies the first criterion. Therefore, the electronic device is configured to determine the transition parameter as indicating a change of transportation mode at the stop 24E.

At the stop 24D, the electronic device has determined that the transition parameter does not satisfy the first criterion. Therefore, the electronic device is configured to determine the transition parameter as indicating an unchanged transportation mode at the stop 24D. At the stop 24F, the electronic device has determined that the transition parameter does not satisfy the first criterion. Therefore, the electronic device is configured to determine the transition parameter as indicating an unchanged transportation mode at the stop 24F. Optionally, the electronic device is configured to determine the transportation mode of each of the one or more sections (such as classifying the one or more sections into a transportation mode). The electronic device has determined (such as assigned) the transportation mode of the sections 26D and 26E to be "truck" mode (for example based on the speed, the time, and/or the map feature class of the wireless device along the sections). The electronic device has determined the transportation mode of the sections 26F and 26G to be "train" mode (for example based on the speed, the time, and/or the map feature class of the wireless device along the sections).

The transition parameter may be indicative of a load indicator, an unload indicator, and/or a geographical indicator. For example, at the stop 24E, where the electronic device has determined that the transition parameter satisfies the first criterion, the electronic device may output a transportation parameter being indicative of (such as comprising)

a load indicator and an unload indicator. The load indicator may comprise a status "loading performed at the first stop 24E" and/or the unload indicator may comprise a status "unloading performed at the first stop 24E".

Figure 6:
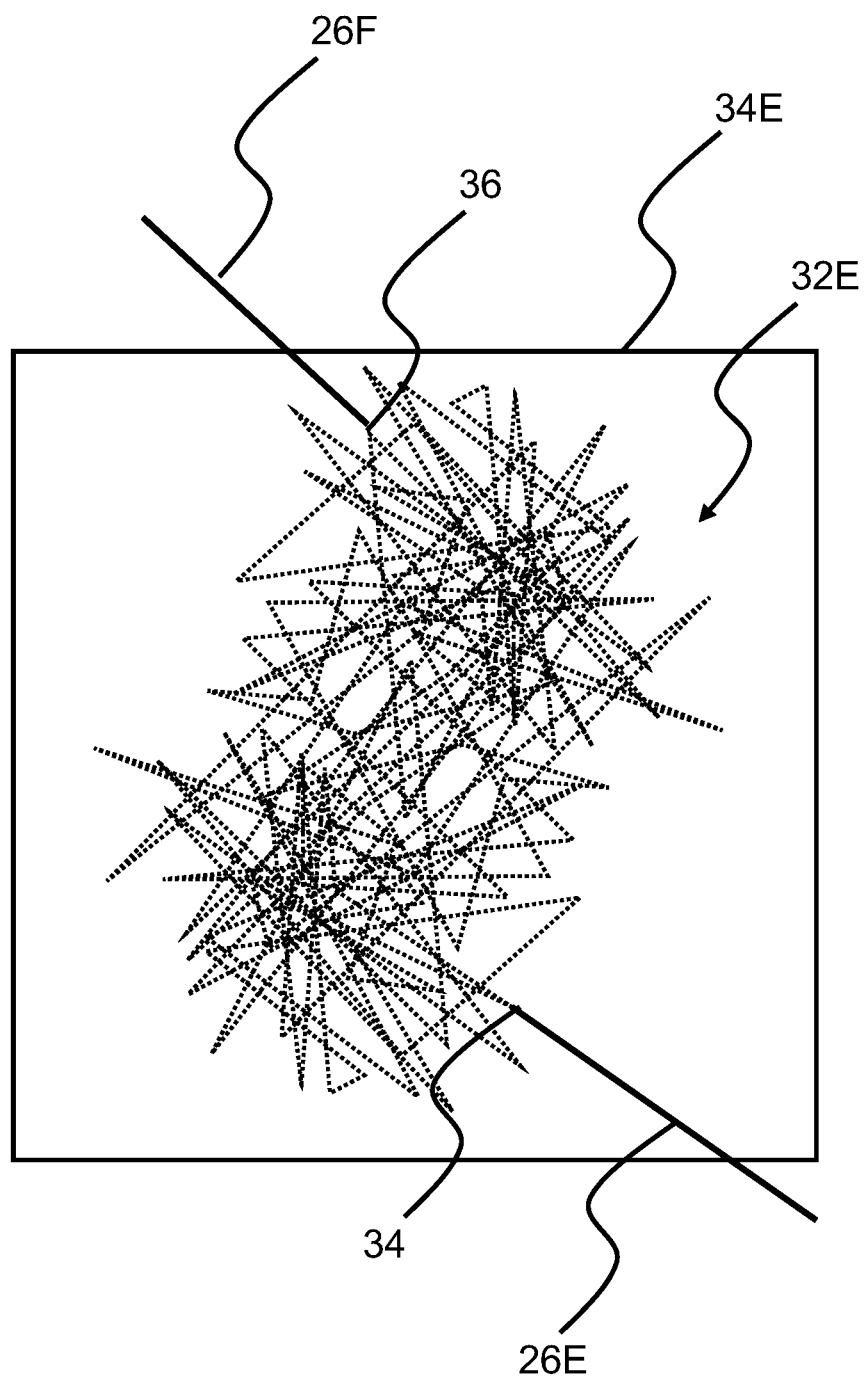
FIG. 6 is a schematic representation illustrating an example showing a close-up view of a stop set of a transportation journey.
Figure 7:
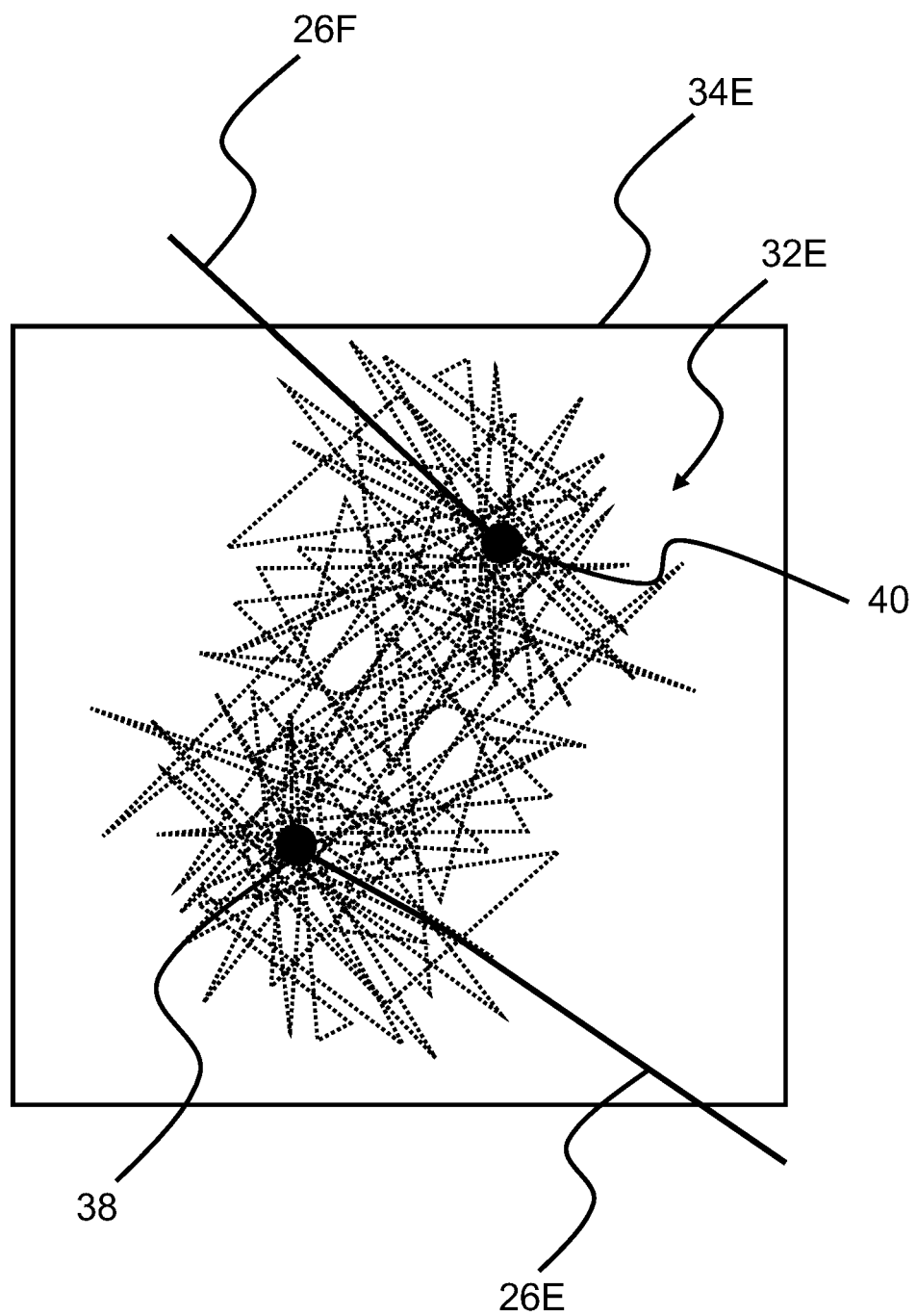
FIG. 7 is a schematic representation illustrating an example showing a close-up view of the stop set of FIG. 6 of the transportation journey.

FIG. 6 is a schematic representation illustrating an example showing a close-up view of a stop set 34E of a transportation journey (such as comprising one or more stops, for example comprising the first stop as disclosed herein, such as the first stop 24E). FIG. 6 and FIG. 7 may illustrate unloading and/or loading activity of the wireless device, for example in a warehouse.

As it can be seen on FIG. 6, the square representing the stop set 34E comprises lines 32E representing positioning data of the wireless device associated with the stop set 34E. The lines 32E may indicate that the positioning data (such as the output from the positioning sensor, for example the positioning sensor 305, not shown) is noisy when the wireless device 500 is substantially not moving (such as standing still) for example at the stop coordinates associated with the stop set 34E. The section 26E ends (such as endpoint of the section 26E) at coordinate 36. The section 26F starts (such as start-point of the section 26F) is not shown. The electronic device may be configured to determine, using an anomaly detector and the movement data associated with the stop set 34E, an anomaly parameter, and determine whether the anomaly parameter satisfies a second criterion. The anomaly parameter may comprise a first pair of coordinates 34 included in the stop set 34E. In other words, the electronic device is configured to apply the anomaly detector to the first pair of coordinates 34 of the stop set 34E.

The anomaly parameter may comprise coordinates 36 of the stop set 34E, which may be denoted as the last pair of coordinates of a stop delimiting the section 26E. Coordinates 34 and/or 36 may be denoted stop coordinates associated with corresponding stops. In other words, the electronic device may be configured to apply the anomaly detector to coordinates 36 of the stop set 34E, which may be denoted as the last pair of coordinates of a stop delimiting the section 26F.

The anomaly parameter may comprise the pairs of coordinates between the first pair and the last pair of coordinates. In other words, the electronic device may then be configured to repeat the applying of the anomaly detector to the remaining pairs of coordinates included in the stop set 34E.

The second criterion may be indicative of a largest anomaly, such as the second criterion may comprise one or more thresholds, for example for acceleration anomaly. In other words, to determine whether the anomaly parameter satisfies the second criterion may comprise determining which pair of coordinates of the stop set 34E has the largest anomaly (such as being indicative of a change of transportation mode). In other words, the determination of the anomaly parameter may comprise a detection of one or more anomalies amongst the movement data associated with the stop coordinates of the stop set 34E. For example, the determination of the anomaly parameter may comprise a detection of a first anomaly in the movement data, where the first anomaly is associated with a first anomaly parameter. The first anomaly parameter may comprise coordinates of the first anomaly. The determination of the anomaly parameter may comprise a detection of a second anomaly in the movement data, where the second anomaly is associated with a second anomaly parameter. The second anomaly parameter may comprise coordinates of the second anomaly. The electronic device may determine which anomaly parameter satisfies the second criterion by identifying which anomaly parameter provides the largest anomaly parameter between the first anomaly parameter and the second parameter. For example, the largest anomaly parameter may be the anomaly parameter with the largest deviation in the movement data. The largest deviation may be identified by comparing all the anomaly parameters obtained and/or with an average value, and/or a median value and/or a predetermined value. In other words, the coordinate of the first anomaly and the coordinates of the second anomaly may correspond to the pair of coordinates of the stop set 34E that show the largest anomaly.

FIG. 7 is a schematic representation illustrating an example showing a close-up view of the stop set 34E of FIG. 6 of the transportation journey (such as comprising one or more stops, for example comprising the first stop as disclosed herein).

In FIG. 7, the electronic device has determined the pair of coordinates 38, 40 of the stop set 34E that has the largest anomaly (such as being indicative of a change of transportation mode). As may be observed in FIG. 7, the position of the wireless device has changed the most between the coordinate 38 and the coordinate 40. The electronic device may be configured to update the section set and/or the stop set based on the first pair of coordinates 38, 40, that satisfies the second criterion and the time parameter. In other words, the electronic device may be configured to assign (such as extend) an actual end-point of the section 26E to the coordinate 38, and to assign (such as extend) an actual start-point of the section 26F to the coordinate 40. For example, the pair of coordinates 38, 40 of the stop set 34E that has the largest anomaly may each have an associated timestamp. The timestamps of the pair of coordinates 38, 40 may be used to assign an actual end-point of the section 26E to the coordinate 38, and to assign an actual start-point of the section 26F to the coordinate 40.

For example, the coordinate 38 may be representative of a first stop, such as the first stop as disclosed herein. For example, the coordinate 40 may be representative of a second stop. Examples of methods and electronic devices according to the disclosure are set out in the following items:

Item 1. An electronic device comprising memory circuitry, a wireless interface, and processor circuitry, wherein the processor circuitry is configured to:
  obtain positioning data and movement data from a wireless device;
  determine, based on the positioning data, one or more stops including a first stop of a transportation journey of the wireless device;
  determine, based on movement data associated with the first stop, a transition parameter associated with the first stop;
  determine whether the transition parameter satisfies a first criterion indicative of a change of transportation mode at the first stop;
  output, based on the transition parameter, a transportation parameter.

Item 2. The electronic device according to item 1, wherein the positioning data comprises a position set comprising position coordinates of the wireless device associated with the transportation journey.

Item 3. The electronic device according to any of the previous items, wherein the movement data comprises inertial measurement data.

Item 4. The electronic device according to item 3, wherein the inertial measurement data comprises a time parameter.

Item 5. The electronic device according to any of items 2-4, wherein the determining of one or more stops of the transportation journey of the wireless device is based on obtaining, from the position set, a stop set comprising stop coordinates associated with the one or more stops.

Item 6. The electronic device according to any of the previous items, wherein the processor circuitry is configured to determine one or more sections of the transportation journey based on the positioning data and the one or more stops.

Item 7. The electronic device according to any of items 5-6, wherein the determining of one or more sections of the transportation journey is based on obtaining, from the position set, a section set comprising section coordinates associated with the one or more sections.

Item 8. The electronic device according to item 7, wherein a section is located between two stops of the one or more stops.

Item 9. The electronic device according to any of the previous items, wherein when it is determined that the transition parameter satisfies the first criterion, the processor circuitry is configured to determine the transition parameter as indicating a change of transportation mode at the first stop.

Item 10. The electronic device according to item 9, wherein the transition parameter indicating the change of transportation mode at the first stop is associated with a stop set comprising stop coordinates associated with the first stop.

Item 11. The electronic device according to any of the previous items, wherein the transition parameter is indicative of one or more of: a load indicator, an unload indicator, and a geographical indicator.

Item 12. The electronic device according to any of the previous items, wherein the determination of whether the transition parameter satisfies the first criterion is based on:
  determining, using an anomaly detector and the movement data associated with the first stop, an anomaly parameter, and
  determining whether the anomaly parameter satisfies a second criterion.

Item 13. The electronic device according to any of items 10-12, wherein the anomaly parameter comprises a first pair of coordinates of the stop set associated with the first stop.

Item 14. The electronic device according to any of items 6-13, wherein when the one or more sections and/or the one or more stops satisfy a map criterion, the processor circuitry is configured to assign a map feature class to each of the one or more sections and/or to each of the one or more stops.

Item 15. The electronic device according to any of items 6-14, wherein the processor circuitry is configured to determine the transportation mode of each of the one or more sections.

Item 16. The electronic device according to any of the previous items, wherein when it is determined that the transition parameter does not satisfy the first criterion, the processor circuitry is configured to determine the transition parameter as indicating an unchanged transportation mode at the first stop.

Item 17. The electronic device according to any of items 12-16, wherein the processor circuitry is configured to generate anomaly detector data based on one or more of: the transition parameter, the positioning data, and the movement data.

Item 18. The electronic device according to any of items 16-17, wherein the processor circuitry is configured to update the anomaly detector based on the anomaly detector data.

Item 19. The electronic device according to any of items 13-18, wherein the processor circuitry is configured to update the section set and/or the stop set based on the first pair that satisfies the second criterion and the time parameter.

Item 20. The electronic device according to any of the previous items, wherein the wireless device acts as the electronic device.

Item 21. The electronic device according to any of items 1-19, wherein the electronic device is a server device.

Item 22. A method, performed by an electronic device, the method comprising:
  obtaining (S102) positioning data and movement data from a wireless device;
  determining (S104), based on the positioning data, one or more stops including a first stop of a transportation journey of the wireless device;
  determining (S106), based on movement data associated with the first stop, a transition parameter associated with the first stop;
  determining (S108) whether the transition parameter satisfies a first criterion indicative of a change of transportation mode at the first stop; and
  outputting (S110), based on the transition parameter, a transportation parameter.

Item 23. The method according to item 22, wherein the positioning data comprises a position set comprising position coordinates of the wireless device associated with the transportation journey.

Item 24. The method according to any of the previous items, wherein the movement data comprises inertial measurement data.

Item 25. The method according to item 24, wherein the inertial measurement data comprises a time parameter.

Item 26. The method according to any of items 23-25, wherein the determining (S104) of one or more stops of the transportation journey of the wireless device is based on obtaining (S104A), from the position set, a stop set comprising stop coordinates associated with the one or more stops.

Item 27. The method according to any of items 22-26, the method comprising determining (S112) one or more sections of the transportation journey based on the positioning data and the one or more stops.

Item 28. The method according to any of items 26-27, wherein the determining (S112) of one or more sections of the transportation journey is based on obtaining (S112A), from the position set, a section set comprising section coordinates associated with the one or more sections.

Item 29. The method according to item 28, wherein a section is located between two stops of the one or more stops.

Item 30. The method according to any of items 22-29, wherein when it is determined that the transition parameter satisfies the first criterion, the method comprises determining (S114) the transition parameter as indicating a change of transportation mode at the first stop.

Item 31. The method according to any of items 26-30, wherein the transition parameter indicating the change of transportation mode at the first stop is associated with a stop set comprising stop coordinates associated with the first stop.

Item 32. The method according to any of items 22-31, wherein the transition parameter is indicative of one or more of: a load indicator, an unload indicator, and a geographical indicator.

Item 33. The method according to any of items 22-32, wherein the determining (S108) of whether the transition parameter satisfies the first criterion is based on:
determining (S108A), using an anomaly detector and the movement data associated with the first stop, an anomaly parameter, and
determining (S108B) whether the anomaly parameter satisfies a second criterion.

Item 34. The method according to any of items 31-33, wherein the anomaly parameter comprises a first pair of coordinates of the stop set associated with the first stop.

Item 35. The method according to any of items 27-34, wherein when the one or more sections satisfy a map criterion, the method comprises assigning (S116) a map feature class to each of the one or more sections.

Item 36. The method according to any of items 27-35, the method comprising determining (S118) the transportation mode of each of the one or more sections.

Item 37. The method according to any of items 22-36, wherein when it is determined that the transition parameter does not satisfy the first criterion, the method comprises determining (S111) the transition parameter as indicating an unchanged transportation mode at the first stop.

Item 38. The method according to any of items 33-37, the method comprising generating (S120) anomaly detector data based on one or more of: the transition parameter, the positioning data, and the movement data.

Item 39. The method according to any of items 37-38, the method comprising updating (S122) the anomaly detector based on the anomaly detector data.

Item 40. The method according to any of items 34-38, the method comprising updating (S124) the section set and/or the stop set based on the first pair that satisfies the second criterion and the time parameter.

Item 41. The method according to any of items 22-40, wherein the wireless device acts as the electronic device.

Item 42. The method according to any of items 22-40, wherein the electronic device is a server device.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-7 comprise some circuitries or operations which are illustrated with a solid line and some circuitries or operations which are illustrated with a dashed line. Circuitries or operations which are comprised in a solid line are circuitries or operations which are comprised in the broadest example. Circuitries or operations which are comprised in a dashed line are examples which may be comprised in, or a part of, or are further circuitries or operations which may be taken in addition to circuitries or operations of the solid line examples. It should be appreciated that these operations need not be performed in order presented. Furthermore, it should be appreciated that not all of the operations need to be performed. The example operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the examples may be implemented at least in part by means of both hardware and software, and that several "means", "units" or "devices" may be represented by the same item of hardware.

The various example methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program circuitries may include routines, programs, objects, components, data structures, etc. that perform specified tasks or implement specific abstract data types. Computer-executable instructions, associated data structures, and program circuitries represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed disclosure, and it will be made obvious to those skilled in the art that various changes and modifications may be made without departing from the scope of the claimed disclosure. The specification and drawings are, accordingly, to be regarded in an illustrative rather than restrictive sense. The claimed disclosure is intended to cover all alternatives, modifications, and equivalents.

What is claimed is:

1. An electronic device comprising memory circuitry, a wireless interface, and processor circuitry, wherein the processor circuitry is configured to:
   obtain positioning data and movement data from a wireless device;
   determine, based on the positioning data, one or more stops including a first stop of a transportation journey of the wireless device;
   assign a map feature class to the first stop, the map feature class being indicative of a context of the first stop;
   determine, based on movement data associated with the first stop, a transition parameter associated with the first stop, the transition parameter being indicative of a geographical indicator associated with the first stop, the geographical indicator being based on the map feature class assigned to the first stop and comprising a probability of a change in transportation mode at the map feature class assigned to the first stop;

detect that a change in transportation mode of the wireless device has occurred by determining whether the transition parameter satisfies a first criterion indicative of a change of transportation mode at the first stop; and output, based on the transition parameter satisfying the first criterion, a transportation parameter, wherein the transportation parameter comprises an indication that the change in the transportation mode of the wireless device was detected.

2. The electronic device according to claim 1, wherein the positioning data comprises a position set comprising position coordinates of the wireless device associated with the transportation journey.

3. The electronic device according to claim 1, wherein the movement data comprises inertial measurement data.

4. The electronic device according to claim 3, wherein the inertial measurement data comprises a time parameter.

5. The electronic device according to claim 2, wherein the determining of one or more stops of the transportation journey of the wireless device is based on obtaining, from the position set, a stop set comprising stop coordinates associated with the one or more stops.

6. The electronic device according to claim 1, wherein the processor circuitry is configured to determine one or more sections of the transportation journey based on the positioning data and the one or more stops.

7. The electronic device according to claim 6, wherein the determining of one or more sections of the transportation journey is based on obtaining, from the position set, a section set comprising section coordinates associated with the one or more sections.

8. The electronic device according to claim 7, wherein a section is located between two stops of the one or more stops.

9. The electronic device according to claim 1, wherein the transition parameter indicating the change of transportation mode at the first stop is associated with a stop set comprising stop coordinates associated with the first stop.

10. The electronic device according to claim 1, wherein the determination of whether the transition parameter satisfies the first criterion is based on:
    determining, using an anomaly detector and the movement data associated with the first stop, an anomaly parameter, and
    determining whether the anomaly parameter satisfies a second criterion.

11. The electronic device according to claim 10, wherein the anomaly parameter comprises a first pair of coordinates of the stop set associated with the first stop.

12. The electronic device according to claim 6, wherein the processor circuitry is configured to assign a map feature class to each of the one or more sections and/or to each of the one or more stops based on the one or more sections and/or the one or more stops satisfying a map criterion.

13. The electronic device according to claim 6, wherein the processor circuitry is configured to determine the transportation mode of each of the one or more sections.

14. The electronic device according to claim 1, wherein the processor circuitry is configured to determine the transition parameter as indicating an unchanged transportation mode at the first stop based on determining that the transition parameter does not satisfy the first criterion.

15. The electronic device according claim 10, wherein the processor circuitry is configured to generate anomaly detector data based on one or more of: the transition parameter, the positioning data, and/or the movement data.

16. The electronic device according to claim 15, wherein the processor circuitry is configured to update the anomaly detector based on the anomaly detector data.

17. An electronic device comprising memory circuitry, a wireless interface, and processor circuitry, wherein the processor circuitry is configured to:
    obtain positioning data and movement data from a wireless device;
    determine, based on the positioning data, one or more stops including a first stop of a transportation journey of the wireless device;
    determine, based on movement data associated with the first stop, a transition parameter associated with the first stop;
    detect that a change in transportation mode of the wireless device has occurred by determining whether the transition parameter satisfies a first criterion indicative of a change of transportation mode at the first stop; and
    output, based on the transition parameter satisfying the first criterion, a transportation parameter,
    wherein the transition parameter comprises an indication that the change in the transportation mode of the wireless device was detected,
    wherein the movement data comprises inertial measurement data comprising a time parameter,
    wherein the processor circuitry is configured to determine one or more sections of the transportation journey based on the positioning data, and the one or more stops, and obtain, from the position set, a section set comprising section coordinates associated with the one or more sections,
    wherein the determination of whether the transition parameter satisfies the first criterion is based on determining, using an anomaly detector and the movement data associated with the first stop, an anomaly parameter and determining whether the anomaly parameter satisfies a second criterion,
    wherein the processor circuitry is configured to update the section set and/or stop coordinates associated with the one or more stops based on a first pair of coordinates of the stop set associated with the first stop that satisfies the second criterion and the time parameter.

18. A method, performed by an electronic device, the method comprising:
    obtaining positioning data and movement data from a wireless device;
    determining, based on the positioning data, one or more stops including a first stop of a transportation journey of the wireless device;
    assigning a map feature class to the first stop, the map feature class being indicative of a context of the first stop;
    detecting that a change in transportation mode of the wireless device has occurred by:
        determining, based on movement data associated with the first stop, a transition parameter associated with the first stop, the transition parameter being indicative of a geographical indicator associated with the first stop, the geographical indicator being based on the map feature class assigned to the first stop and comprising a probability of a change in transportation mode at the map feature class assigned to the first stop; and determining whether the transition parameter satisfies a first criterion indicative of a change of transportation mode at the first stop; and outputting, based on the transition parameter satisfying the first criterion, a transportation parameter, wherein the transportation parameter comprises an indication that the change in the transportation mode of the wireless device was detected.

* * * * *